(12) United States Patent
Endo et al.

(10) Patent No.: US 6,924,569 B2
(45) Date of Patent: Aug. 2, 2005

(54) BICYCLE HUB GENERATOR

(75) Inventors: Takahiro Endo, Osaka (JP); Kazuhiro Fujii, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/883,991

(22) Filed: Jul. 6, 2004

(65) Prior Publication Data

US 2005/0029879 A1 Feb. 10, 2005

(30) Foreign Application Priority Data

Aug. 29, 2003 (JP) .................................... 2003-306907

(51) Int. Cl.[7] .......................................... H02K 11/00
(52) U.S. Cl. ...................................... 310/67 A; 310/71
(58) Field of Search .............................. 310/71, 67 A, 310/75 C, 75 D; 180/65.1–65.8

(56) References Cited

U.S. PATENT DOCUMENTS

| 5,115,159 | A | * | 5/1992 | Takamiya et al. | 310/67 A |
|---|---|---|---|---|---|
| 5,268,602 | A | * | 12/1993 | Schwaller | 310/67 A |
| 5,272,938 | A | * | 12/1993 | Hsu et al. | 74/594.1 |
| 5,450,915 | A | * | 9/1995 | Li | 180/65.5 |
| 5,581,136 | A | * | 12/1996 | Li | 310/67 R |
| 5,828,145 | A | * | 10/1998 | Nakamura | 310/67 A |
| 6,100,615 | A | * | 8/2000 | Birkestrand | 310/75 C |
| 6,286,616 | B1 | * | 9/2001 | Kutter | 180/205 |
| 6,605,884 | B2 | * | 8/2003 | Nishimoto | 310/67 A |
| 6,793,045 | B2 | * | 9/2004 | Matsueda | 188/26 |

FOREIGN PATENT DOCUMENTS

| EP | 0528347 | 2/1993 |
|---|---|---|
| EP | 1394030 | 3/2004 |
| JP | 48-103805 U | 12/1973 |

* cited by examiner

*Primary Examiner*—Dang Le
(74) *Attorney, Agent, or Firm*—Shinjyu Global IP Counselors, LLP (57) ABSTRACT

A hub generator for a bicycle having a hub shaft, a hub body, an electricity generating mechanism, a wiring unit, a wiring passage, and a wiring draw-out part is provided. Both ends of the hub shaft are adapted to be mounted in a non-rotational manner to a frame of the bicycle using first and second nuts. The wiring unit is connected to the electricity generating mechanism and configured to be connected to an external device. The wiring passage is formed inside the hub shaft and extends from the electricity generating mechanism to the first shaft end of the hub shaft such that the wiring unit can be drawn out from the first shaft end. The wiring draw-out part is configured to be mounted to the first nut at the first shaft end and guide the wiring unit from the first shaft end to the outside.

16 Claims, 8 Drawing Sheets

BICYCLE HUB GENERATOR

BACKGROUND OF THE INVENTION

1. Field of the Invention

The present invention relates to a bicycle hub generator. More specifically, the present invention relates to a bicycle hub generator provided in a center portion of a wheel of a bicycle configured to deliver electric power to an external device mounted to the bicycle.

2. Background Information

A conventional hub provided at a center portion of a wheel of a bicycle generally includes a hub shaft, a hub body and a bearing. The hub shaft is mounted in a freely detachable but non-rotatable manner to the frame (e.g., front fork or chain stay) of the bicycle. The hub body is mounted in a freely rotatable manner to the hub shaft. The bearing is configured to support the hub body in a freely rotatable manner on the hub shaft. The hub body usually has a pair of hub flanges, i.e., one on the outer circumference of each end of the hub body, configured such that the spokes of the wheel can be hooked thereto.

The conventional bicycle hub explained above is sometimes equipped with a hub generator such as the one disclosed in the Japanese Laid-Open Utility Model Patent Publication No. 48-103805 (microfilm of Utility Model Patent Application No. 47-028241). The hub generator disclosed in the above mentioned reference has an electricity generating mechanism that is built into the hub body to serve as an electric power source for a lamp or other external device of the bicycle. By building the electricity generating mechanism into the hub body in this fashion, electricity can be generated without contacting or sliding against a rotating portion. Thus, the electric generating efficiency improves and the wheel rotation loss decreases in comparison with electricity generating devices that contact the rim of the wheel. A conventional hub generator uses wires to deliver the electric power generated by the electricity generating mechanism to the lamp or other external device of the bicycle. In the above mentioned reference, the wires pass not along the outer circumference of the hub shaft but through a hole formed through the center of the hub shaft and the wires are drawn out from the end of the hub shaft.

Accordingly, with the conventional hub generator disclosed in the above mentioned reference, the wires are passed through the inside of the hub shaft. Therefore, it is easier to protect the wires than a case in which the wires are passed along the outside circumference of the hub shaft. However, since the wires that are drawn out from the end of the hub shaft are exposed to the outside, the wires are not protected and could possibly be broken. A feasible solution is to provide a cover member on the end of the hub shaft to cover the wires drawn out from the end of the hub shaft. However, in order to mount the cover member, a separate mounting structure is required and the structure of the hub generator becomes more complex.

In view of the above, it will be apparent to those skilled in the art from this disclosure that there exists a need for an improved bicycle hub generator that can protect the wires that are drawn out from the end of the hub shaft with a simple structure. This invention addresses this need in the art as well as other needs, which will become apparent to those skilled in the art from this disclosure.

SUMMARY OF THE INVENTION

One object of the present invention is to provide a bicycle hub generator that can protect the wires drawn out from the end of the hub shaft with a simple structure.

In accordance with the first aspect of the present invention, a bicycle hub generator is provided that comprises a hub shaft, a hub body, an electricity generating mechanism, a wiring unit, a wiring passage and a wiring draw-out part. The hub shaft has first and second shaft ends with first and second connecting members, respectively, adapted to be coupled to a frame of the bicycle. The hub body is coupled to the hub shaft such that the hub body rotates freely with respect to the hub shaft. The electricity generating mechanism is disposed between the hub body and the hub shaft. The electricity generating mechanism is configured and arranged to generate electricity using a relative rotation of the hub body with respect to the hub shaft. The wiring unit is coupled to the electricity generating mechanism and configured and arranged to be coupled to an external bicycle device for supplying the electricity to the external bicycle device. The wiring passage extends inside the hub shaft between the electricity generating mechanism and the first shaft end such that the wiring unit passes through the wiring passage from the electricity generating mechanism and extends out from the first shaft end. The wiring draw-out part is coupled to the first connecting member at the first shaft end. The wiring draw-out part is configured and arranged to guide the wiring unit from the first shaft end to outside of the wiring draw-out part.

With the first aspect of the present invention, the portion of the wiring unit that extends through the wiring passage and drawn out from the first shaft end is protected because the wiring unit is guided to the outside by the wiring draw-out part. Since the wiring draw-out part is mounted by engaging with the first connecting member, there is no need for a special mounting structure. Therefore, the structure of the wiring draw-out part remains simple.

A bicycle hub generator in accordance with a second aspect of the present invention is a bicycle hub generator as described in the first aspect of the present invention, wherein a freewheel is provided on a first lateral face of the hub body, e.g., the lateral face that is on the right-hand side when the hub body is viewed from the rear. The freewheel is configured such that a multiple-gear cassette can be mounted in a non-rotatable manner to the outside thereof and such that the freewheel can only transmit rotation to the hub body in the direction of travel of the bicycle. Moreover, the first shaft end of the hub shaft is the left-hand shaft end when the hub shaft is viewed from the rear. With this bicycle hub generator, the wiring unit can be routed in a less complex manner because the wiring unit is drawn out on the opposite side as the side where the multiple-gear cassette is located, i.e., the side where a rear derailleur or other externally mounted gear changing device is used.

A bicycle hub generator in accordance with a third aspect of the present invention is a bicycle hub generator as described in the second aspect of the present invention, wherein the hub body includes a cylindrical case main body that has an opening provided on the side thereof corresponding to the first lateral face through which the electricity generating mechanism can be installed. The bicycle hub generator in accordance with the third aspect of the present invention also includes a lid member that is mounted to the case main body in a freely detachable manner and configured to cover the opening. Moreover, the freewheel is mounted to the lid member. With this bicycle hub generator, the freewheel can be attached and detached to and from the case main body together with the lid member, making maintenance of the electricity generating mechanism easier to perform.

A bicycle hub generator in accordance with a fourth aspect of the present invention is a generator as described in any one of bicycle hub generators according to the first to third aspects of the present invention, wherein a brake device mounting part for mounting a brake device configured to brake the hub body is provided on a second lateral face of the hub body, e.g., the lateral face on the opposite side of the hub body as the first lateral face. With this bicycle hub generator, a hub brake, such as a disk brake or a roller brake, configured to brake the hub directly (not the rim) can be mounted to the hub body, making it easier to fit a comparatively high-performance bicycle with electric components.

A bicycle hub generator in accordance with a fifth aspect of the present invention is a bicycle hub generator as described in any one of the first to fourth aspects of the present invention, wherein the wiring draw-out part is mounted in a non-rotatable manner to the first connecting member and is configured such that the wiring unit drawn out from the first shaft end is folded back from the first shaft end and guided to the outside in such a manner that the wiring unit can be made to follow along the frame. With this bicycle hub generator, it is easy to make the wiring coming out of the wiring draw-out part follow along the frame.

A bicycle hub generator in accordance with a sixth aspect of the present invention is a bicycle hub generator as described in the fifth aspect of the present invention, wherein the wiring draw-out part includes a guide member and a cover member. The guide member is configured to engage in a non-rotatable manner with the radially outward facing surface of the first connecting member to guide the wiring unit. The cover member is configured to mount in a detachable manner to the guide member to cover the wiring unit guided by the guide member. With this bicycle hub generator, the wiring unit is protected with certainty because the guide member is covered by the cover member and the wiring draw-out part can be securely fastened to the connecting member.

A bicycle hub generator in accordance with a seventh aspect of the present invention is a bicycle hub generator as described in the fifth or sixth aspect of the present invention, wherein the first connecting member is a hexagonal nut, and the guide member is configured to be mounted to the radially outward facing surfaces of the first connecting member in six or more different rotational orientations. With this bicycle hub generator, the guide member can be mounted to the radially outward facing surfaces of the first connecting member at many different rotational orientations. Therefore, the direction in which wiring is drawn out is not greatly affected by variations in the rotational orientation achieved by the first connecting member when the hub shaft is fastened to the frame.

A bicycle hub generator in accordance with a eighth aspect of the present invention is a bicycle hub generator as described in the sixth or seventh aspect of the present invention, wherein the guide member has a guiding portion configured to guide the wiring unit in a direction substantially perpendicular to the hub shaft from the first shaft end. With this bicycle hub generator, the wiring unit can be protected with the bicycle falls over because the wiring is guided in a direction perpendicular to the hub shaft.

A bicycle hub generator in accordance with a ninth aspect of the present invention is a bicycle hub generator as described in the eighth aspect of the present invention, wherein the guiding portion comprises a groove capable of housing the wiring. With this bicycle hub generator, the wiring unit can be housed inside the guiding portion.

A bicycle hub generator in accordance with a tenth aspect of the present invention is a bicycle hub generator as described in any one of the sixth to ninth aspects of the present invention, wherein the guide member is provided with a screw-threaded hole for mounting the cover member with a first screw-threaded member. With this bicycle hub generator, the cover member can be attached and detached easily by means of the first screw-threaded member.

A bicycle hub generator in accordance with an eleventh aspect of the present invention is a bicycle hub generator as described in any one of the fifth to tenth aspects of the present invention, wherein the wiring draw-out part is fastened to the first connecting member with a second screw-threaded member that is screwed in radially toward a radially outward facing surface of the first connecting member. With this bicycle hub generator, the wiring draw-out part can be fastened in a simple manner by merely turning the second screw-threaded member such that the second screw-threaded member moves toward a radially outward facing surface of the first connecting member.

A bicycle hub generator in accordance with a twelfth aspect of the present invention is a bicycle hub generator as described in any one of the first to fourth aspects of the present invention, wherein the wiring draw-out part is rotatably mounted to the first connecting member and is configured to guide the wiring unit such that the wiring unit can be drawn out in a radial direction of the hub shaft. With this bicycle hub generator, the wiring unit can be drawn out in a prescribed direction irregardless of the rotational orientation achieved by the first connecting member when the hub shaft is fastened to the frame.

A bicycle hub generator in accordance with a thirteenth aspect of the present invention is a bicycle hub generator as described in any one of first to twelfth aspects of the present invention, wherein the second connecting member is a cap nut configured to cover the second shaft end. With this bicycle hub generator, the first shaft end is covered by the wiring draw-out part and the second shaft end is protected by the cap nut. As a result, both ends of the hub shaft are less likely to be damaged and the screw threads on the outside of the hub shaft are also protected from damage.

A bicycle hub generator in accordance with a fourteenth aspect of the present invention is a bicycle hub generator as described in any one of the first to thirteenth aspects of the present invention, wherein the wiring draw-out part has a wiring holding part configured to restrain movement of the wiring unit. With this bicycle hub generator, it is difficult for the wiring to break inside the hub shaft even if the wiring is pulled from the outside because the movement of the wiring is restrained by the wiring holding part.

A bicycle hub generator in accordance with a fifteenth aspect of the present invention is a bicycle hub generator as described in the fourteenth aspect of the present invention, wherein the wiring draw-out part guides the wiring unit in a direction substantially perpendicular to the hub shaft from the first shaft end. Moreover, the wiring holding part is arranged farther outward than the portion where the wiring unit bends in said perpendicular direction. With this bicycle hub generator, it is more difficult for the wiring to break because the wiring is held at a position to the outside of the portion where the wiring bends in the perpendicular direction, at which portion it is easy for the wiring the break.

A bicycle hub generator in accordance with a sixteenth aspect of the present invention is a bicycle hub generator as described in any one of the fourteenth and fifteenth aspects of the present invention, wherein the wiring holding part has at least one protrusion arranged to hold the wiring unit. With this bicycle hub generator, the wiring can be held by pressing the wiring with the protrusion and utilizing the elastic quality of the wiring, thus enabling the wiring to be held securely with a simple structure.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
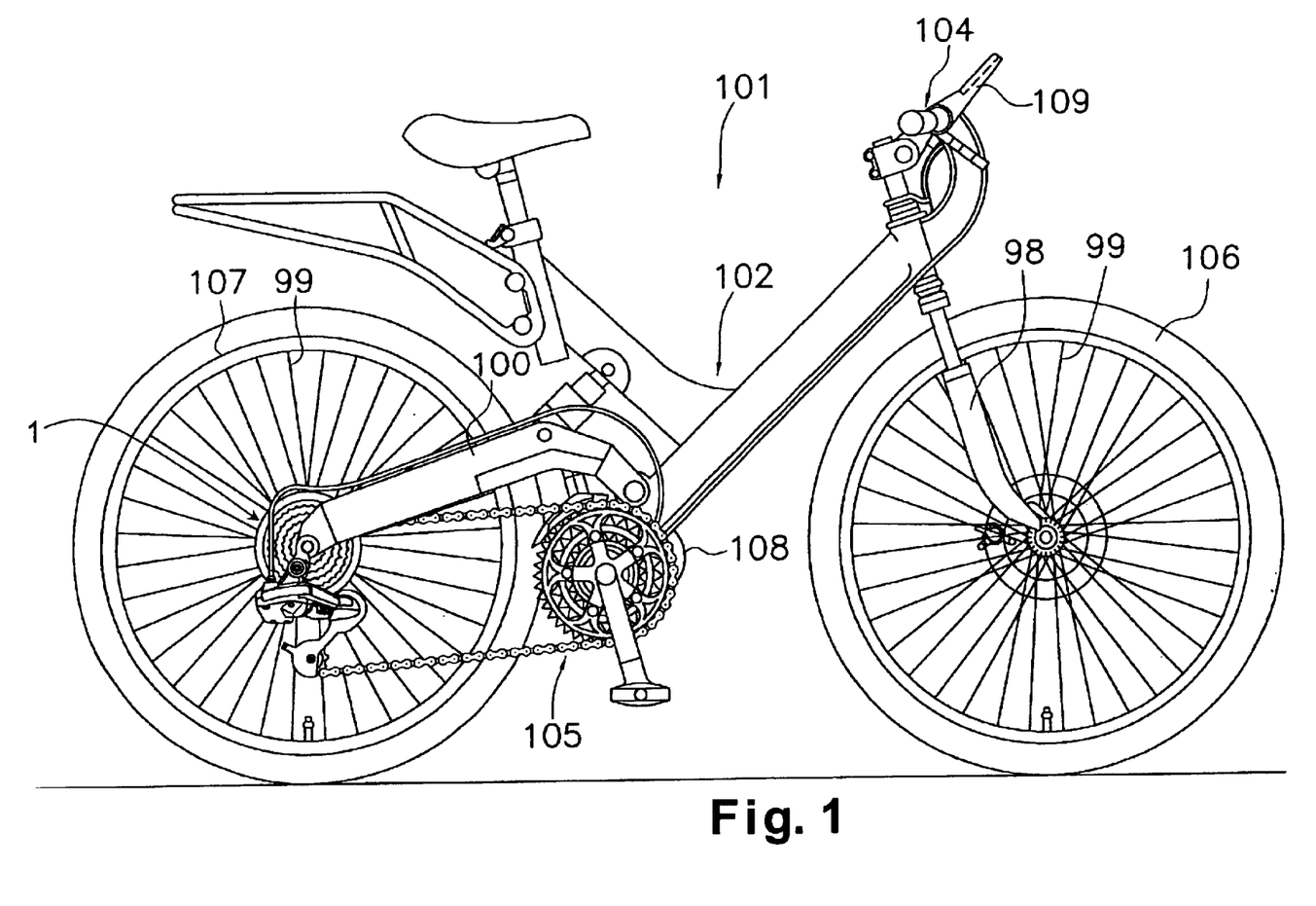
FIG. 1 is a right side elevational view of a bicycle equipped with a bicycle hub generator in accordance with a first embodiment of the present invention.

Referring initially to FIG. 1, a bicycle hub generator 1 is illustrated in accordance with a first embodiment of the present invention. FIG. 1 shows a bicycle 101 that is equipped with the bicycle hub generator 1 in accordance with the first embodiment of the present invention. The bicycle 101 basically comprises a frame 102, a handle bar 104, a drive section 105, a front wheel 106, a rear wheel 107, and two control devices 108 and 109. The frame 102 is provided with front and rear suspensions, i.e., a suspension fork 98 in the front and a swing arm 100 in the rear. The handle bar 104 is fastened to the suspension fork 98. The drive section 105 basically comprises a chain, pedals, derailleurs, etc. The front and rear wheels 106 and 107, respectively, are provided with a plurality of spokes 99 and mounted to the suspension fork 98 and the swing arm 100 as seen in FIG. 1. The two control devices 108 and 109 are configured to control both derailleurs and the front and rear suspensions. In the present embodiment, the bicycle hub generator 1 (shown in detail in FIG. 2) is preferably provided on the rear wheel 107. The control device 108 is preferably disposed in the vicinity of a hanger section at the bottom center of the frame 102 while the control device 109 is preferably mounted to the handle bar 104. The control device 109 preferably has a display section. The bicycle hub generator 1 is configured to generate electric power which is delivered to the control devices 108 and 109. Then, the electric power is also transmitted to the derailleurs and the suspensions through the control devices 108 and 109.

Figure 2:
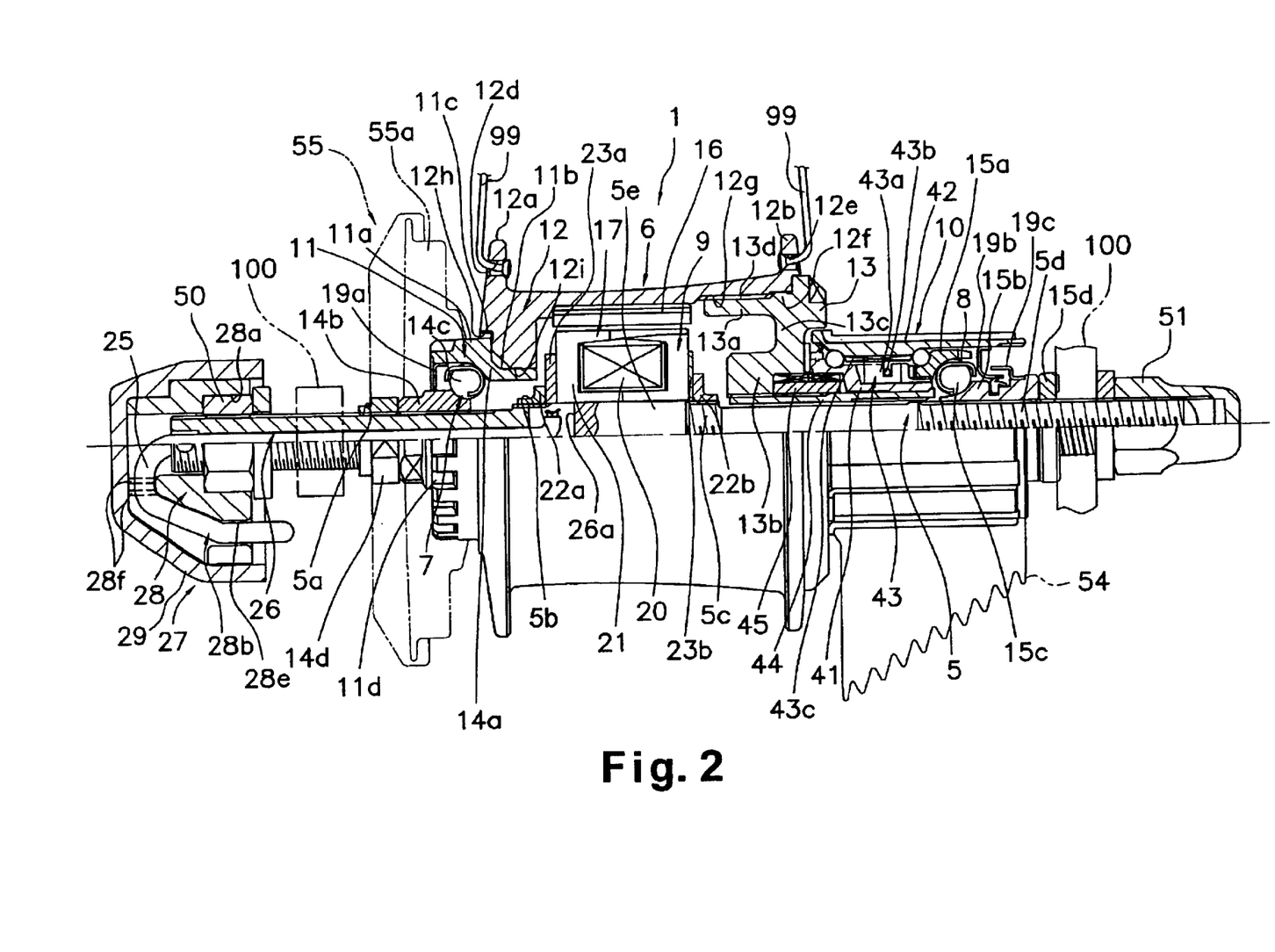
FIG. 2 is a rear partial cross sectional view of the bicycle hub generator in accordance with the first embodiment of the present invention.

FIG. 2 is a rear partial cross sectional view of the bicycle hub generator 1 in accordance with the first embodiment of the present invention. In the present embodiment, the bicycle hub generator 1 basically constitutes a rear hub provided at a center portion of the rear wheel 107 of the bicycle. Both ends of a hub shaft 5 are fastened to the swing arm 100 at the rear side of the frame 102 with first and second connecting members or nuts 50 and 51, respectively. Both hub flanges 12a and 12b are configured and arranged to have the spokes 99 hooked thereto.

More specifically, the bicycle hub generator 1 shown in FIG. 2 is mounted to the rear end of the swing arm 100 along with the rear wheel 107 of the bicycle 101. The bicycle hub generator 1 basically comprises the hub shaft 5, a hub body 6, a pair of bearings 7 and 8 and an electricity generating mechanism 9. The hub shaft 5 is fastened at both ends to the rear end section of the swing arm 100. The hub body 6 is arranged around the outside circumference of the hub shaft 5. The bearings 7 and 8 are configured and arranged to support the hub body 6 in a freely rotatable manner on the hub shaft 5. The electricity generating mechanism 9 is arranged between the hub body 6 and the hub shaft 5 and configured to generate electricity using the relative rotation of the hub body 6 with respect to the hub shaft 5. Also, a freewheel 10 is preferably provided on a first lateral side or the right-hand lateral side of the hub body 6 and a brake mounting part 11 is preferably provided on a second lateral side or the left-hand lateral face of the hub body 6, as shown in FIG. 2. The bicycle hub generator 1 is also provided with a wiring unit 25, a wiring passage 26, and a wiring draw-out part 27. The wiring unit 25 is connected to the electricity generating mechanism 9 and configured to be connected to the control devices 108 and 109 and other external devices of the bicycle 101. The wiring passage 26 is formed inside the hub shaft 5 and extends from the electricity generating mechanism 9 to a first shaft end or the left-hand shaft end of the hub shaft 5 (i.e., left-hand of the hub shaft 5 as viewed in FIG. 2) such that the wiring unit 25 can be drawn out from the left-hand shaft end. The wiring draw-out part 27 is mounted by engaging with the nut 50, which is mounted to the left-hand shaft end of the hub shaft 5 to fixedly couple the hub shaft 5 to the swing arm 100. The wiring draw-out part 27 is configured and arranged to cover the wiring unit 25 and guide the wiring unit 25 to the outside.

Accordingly, with the bicycle hub generator 1 of the first embodiment, the electricity generating mechanism 9 is configured to generate electricity when the rear wheel 107 rotates. The generated electric power is delivered to the external devices of the bicycle 101 through the wiring unit 25. The wiring unit 25 is arranged to extend from the electricity generating mechanism 9 to the left-hand shaft end through the wiring passage 26 formed inside the hub shaft 5. Then the wiring unit 25 is guided to the outside by the wiring draw-out part 27. The wiring draw-out part 27 is mounted by engaging with the first connecting member or the nut 50, which is screwed onto the left-hand shaft end to fasten the hub shaft 5 to the swing arm 100. The portion of the wiring unit 25 that is drawn through the wiring passage 26 and out from the first shaft end is protected because the wiring unit 25 is guided to the outside by the wiring draw-out part 27. Since the wiring draw-out part 27 is mounted by engaging with the nut 50, there is no need for a special mounting structure. Thus, the structure of the wiring draw-out part 27 can remain simple.

Figure 3:
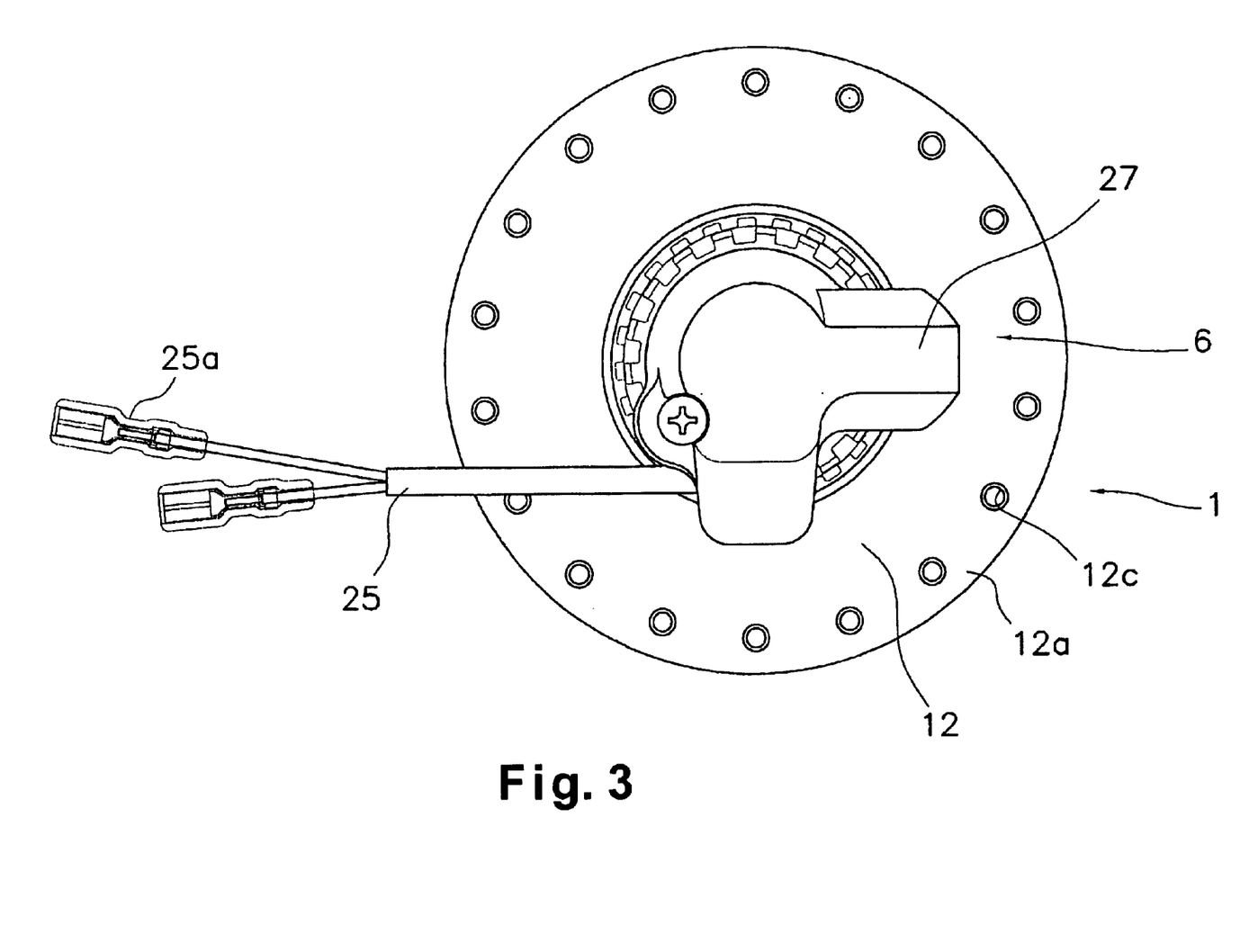
FIG. 3 is an enlarged left side elevational view of the bicycle hub generator in accordance with the first embodiment of the present invention.
Figure 4:
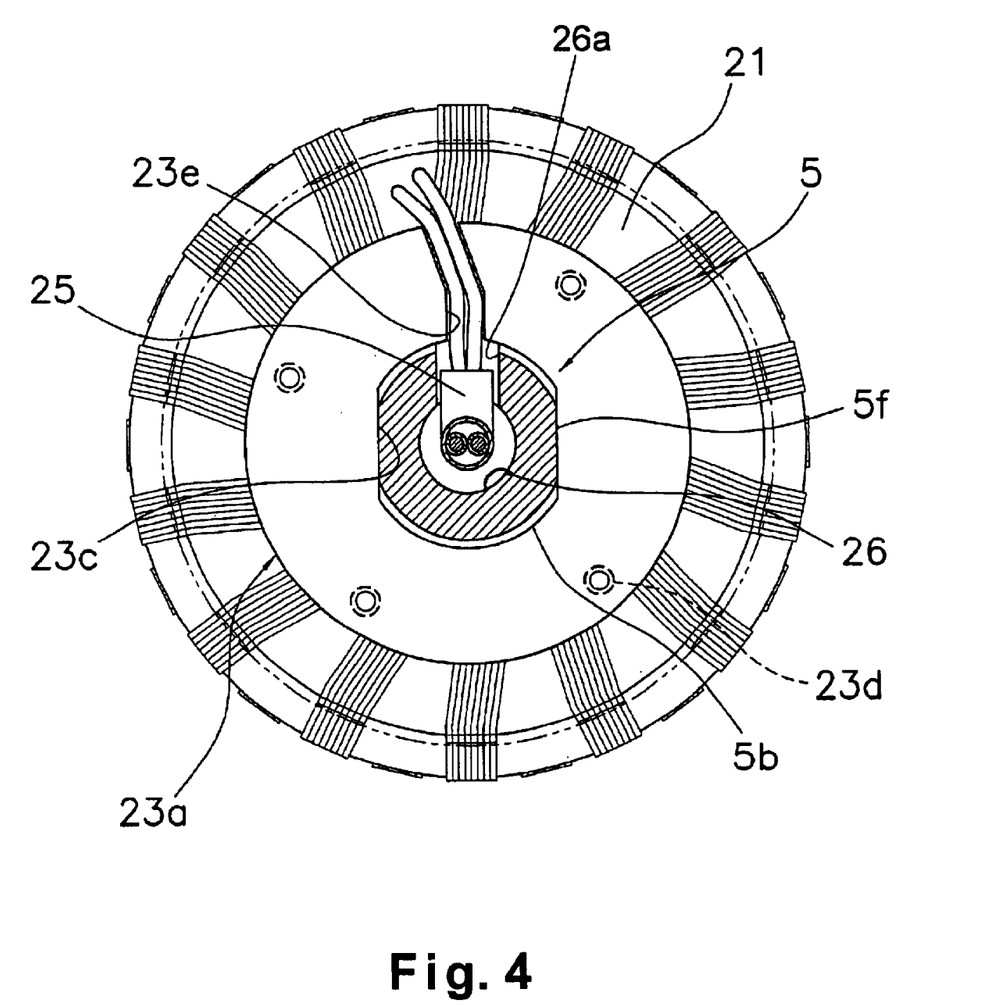
FIG. 4 is an enlarged partial cross sectional view of a stator unit of a electricity generating mechanism, a hub shaft, and a wiring unit of the bicycle hub generator in accordance with the first embodiment of the present invention.

The hub shaft 5 is a cylindrical member made of, for example, chromium-molybdenum steel. Both ends of the hub shaft 5 are fastened to the swing arm 100 with the nuts 50 and 51. The nut 50 is preferably a conventional hexagonal nut and the nut 51 is preferably a cap nut configured to cover a second shaft end or the right-hand shaft end of the hub shaft 5 as seen in FIG. 2. The hub shaft 5 preferably includes a large diameter section 5e where the electricity generating mechanism 9 is mounted. Moreover, the hub shaft 5 preferably includes four externally threaded sections 5a, 5b, 5c and 5d arranged on the radially outward facing surface of the hub shaft 5 in succession from the left-hand end to right-hand end as seen in FIG. 2. The externally threaded section 5a is configured and arranged to threadedly engage with a ball pushing part 14b (discussed later) of the bearing 7, a lock nut 14d for preventing rotation of the ball pushing part 14b, and the nut 50 for fastening the hub shaft 5 to the swing arm 100. The external threaded sections 5b and 5c are formed on both ends of the large diameter section 5e and are used to pinch-secure an internal stator unit 17 (discussed later) of the electricity generating mechanism 9. The externally threaded section 5d is configured and arranged to threadedly engage with a ball pushing part 15b (discussed later) of the bearing 8, a lock nut 15d for preventing rotation of the ball pushing part 15b, and the nut 51 for fastening the hub shaft 5 to the swing arm 100. Each of the externally threaded sections 5b and 5c of the large diameter section 5e of the hub shaft 5 is preferably provided with a pair of mutually parallel flat sections 5f as shown in FIG. 4. The wiring passage 26 is formed in the radial center portion of the hub shaft 5. The hub shaft 5 is provided with a passage hole 26a that communicates radially to the wiring passage 26 in the section where the electricity generating mechanism 9 is mounted on the hub shaft 5. Thus, the wiring unit 25 is guided from the electricity generating mechanism 9 to the wiring passage 26 through the passage hole 26a. Then the wiring unit 25 extends through the wiring passage 26 and is drawn to the outside from the wiring draw-out part 27. Crimping or solderless terminals 25a, for example, are preferably attached to the tip ends of the wiring unit 25 as seen in FIG. 3.

The hub body 6 is preferably made of, for example, a light aluminum alloy and includes a cylindrical case main body 12 and a lid member 13. The case main body 12 has an opening 12f provided in a first lateral side or the right-hand lateral face of the case main body 12 (i.e., right-hand side when viewed as shown in FIG. 2). The lid member 13 is mounted to the case main body 12 in a freely detachable manner and configured to cover the opening 12f of the case main body 12. A pair of hub flanges 12a and 12b are arranged on the radially outward facing surface of the case main body 12 in such a manner as to be spaced apart in the axial direction. The opening 12f in the case main body 12 is configured and arranged to be large enough to allow the electricity generating mechanism 9 to be installed and an internally threaded section 12g is provided in the opening 12f for mounting the lid member 13. The brake mounting part 11 is provided on the left-hand end face (i.e., left-hand when viewed as shown in FIG. 2) of the case main body 12. A covering 19a preferably made of, for example, metal or resin is mounted in a detachable manner to the internal circumferential surface of the left-hand end of the case main body 12 in order to cover the gap between the case main body 12 and the hub shaft 5. The pair of hub flanges 12a and 12b are provided with, for example, sixteen spoke hooking holes 12d and 12e, respectively, that are arranged with equal spacing in the circumferential direction. The spoke hooking holes 12d of the hub flange 12a are preferably arranged offset relative to the spoke hooking holes 12e of the hub flange 12b by a distance of one-half of the pitch in the circumferential direction. The left-hand end face (i.e., left-hand as shown in FIG. 2) of the case main body 12 is also provided with a mounting recessed section 12h having serrations on the radially inward facing surface thereof for preventing rotation of the brake mounting part 11. The left-hand end face of the case main body 12 is also provided with a press fitting hole 12i into which the brake mounting part 11 is press fitted such that the brake mounting part 11 fits tightly against the radially inward facing surface of the fitting hole 12i. Accordingly, with the bicycle hub generator 1 of the present embodiment, a hub brake, such as a disk brake or a roller brake, configured to brake the hub directly (not the rim) can be mounted to the hub body 6. Thus, electric components can be easily equipped on a comparatively high-performance bicycle.

The lid member 13 of the hub body 6 is preferably an integral unit that basically includes an outer cylindrical section 13a, an inner cylindrical section 13b, and a connecting section 13c. The radially outward facing surface of the outer cylindrical section 13a is provided with an externally threaded section 13d configured to be screwed into the internally threaded section 12g of the case main body 12. The inner cylindrical section 13b is arranged radially inward of the outer cylindrical section 13a such that a space exists between the outer cylindrical section 13a and the inner cylindrical section 13b. The connecting section 13c is configured and arranged to connect the two cylindrical sections 13a and 13b. A connecting bolt 44 for connecting the freewheel 10 is screwed into the radially inward facing surface of the inner cylindrical section 13b. With the bicycle hub generator 1 of the present embodiment, the freewheel 10 can be attached and detached to and from the case main body 12 together with the lid member 13. Therefore, maintenance of the electricity generating mechanism is easily performed.

The bearing 7 is installed between the case main body 12 and the hub shaft 5. The bearing 7 includes a ball bearing part 14a provided on the internal surface of the left end of the brake mounting part 11, the ball pushing part 14b configured to be screwed onto the externally threaded section 5a of the hub shaft 5b, and balls 14c configured to roll while in contact with both the ball pushing part 14b and the ball bearing part 14a. The bearing 8 is arranged between the freewheel 10 and the hub shaft 5. The bearing 8 includes a ball bearing part 15a provided on the freewheel 10, a ball pushing part 15b configured to be screwed onto the externally threaded section 5d of the hub shaft 5, and balls 15c configured to roll while in contact with both the ball pushing part 15b and the ball bearing part 15a. The areas surrounding the balls 14c and 15c are preferably filled with grease.

The electricity generating mechanism 9 is configured and arranged to use a claw-pole structure having a permanent magnet 16 fixed to the case main body 12 and the internal stator unit 17 fixed to the hub shaft 5.

The permanent magnet 16 is fixed to the internal surface of the case main body 12 and comprises four magnet bodies divided at equal intervals in the circumferential direction. The permanent magnet 16 is provided with north and south poles arranged alternately with equal spacing such that each faces the outer circumference of a yoke 21 (discussed later).

The internal stator unit 17 has a ring-shaped coil 20 and the yoke 21 provided in such a manner as to surround the coil 20. The coil 20 and yoke 21 are fastened to the hub shaft 5 by a pair of nuts 22a and 22b that screw onto the externally threaded sections 5a and 5b, respectively, formed on the outside of the hub shaft 5. The nuts 22a and 22b pinch the coil 20 and the yoke 21 therebetween. The coil 20 and yoke 21 are positioned such that they face the permanent magnet 16 with respect to the axial direction.

As shown in FIG. 2, washers 23a and 23b are installed on the sides of the nuts 22a and 22b that face the yoke 21, respectively. As shown in FIG. 4, the washer 23a has an engaging hole 23c that is generally oval in shape and has a pair of mutually parallel faces that mate with the flat sections 5f of the hub shaft 5. Thus, the washer 23a engages in a non-rotatable manner with the hub shaft 5. The washer 23a is also provided with a protrusion 23d that protrudes toward the yoke 21 and is configured to engage with the yoke 21 as seen in FIG. 4. The protrusion 23d is preferably formed on the washer 23a by press forming. As seen in FIG. 4, the washer 23a is also provided with a slit 23e for passing the wiring unit 25 that leads out from the coil 20. The slit 23e is preferably formed as a cut-away portion extending radially outward from a position corresponding to the passage hole 26a extending to the wiring passage 26 of the hub shaft 5.

Accordingly, since the washer 23a prevents the internal stator unit 17 from rotating relative to the hub shaft 5, the wiring unit 25 from the coil 20 can be guided reliably to the wiring passage 26. The wiring unit 25 extending through the wiring passage 26 is drawn to the outside of the left-hand end face of the hub shaft 5, and is guided by the wiring draw-out part 27.

As shown in FIG. 2, the freewheel 10 includes a base part 41 that is connected in a non-rotatable manner to a radially inner portion of the lateral face of the lid member 13 of the hub body 6. The freewheel 10 also includes a gear mounting part 42 that is mounted in a freely rotatable manner to the base part 41, and a one-way clutch 43 arranged between the base part 41 and the gear mounting part 42.

As described previously, the base part 41 of the freewheel 10 is connected to the inner cylindrical section 13b with the cylindrical connecting bolt 44 that is screwed into the radially inward facing surface of the inner cylindrical section 13b. The head of the connecting bolt engages with the base part 41. Also, as seen in FIG. 2, the inner cylindrical section 13b and the base part 41 are also connected together in a non-rotational manner by a connecting member 45 arranged between the inner cylindrical section 13b and the base part 41 on the outside of the connecting bolt 44. Serrations are provided on the radially outward facing surface of the connecting member 45 and the connecting member 45 is press fitted into the serrations provided on inner cylindrical section 13b. The serrations of the press fitted connecting member 45 mesh with serrations provided on the radially inward facing surface of one end of the base part 41. As a result, the inner cylindrical section 13b and the base part 41 are securely connected in a non-rotatable manner.

The base part 41 is cylindrical in shape and the ball bearing part 15a of the bearing 8 is screwed thereon. The ball bearing part 15a also serves as a ball pushing part for the bearing that supports the gear mounting part 42 as shown in FIG. 2.

Claw members 43a that constitute the one-way clutch 43 are installed on the base part 41 in such a manner that they can rise and fall freely. The one-way clutch 43 is configured to transmit rotation to the base part 41 only in the direction in which the multiple gear cassette 54 mounted to the gear mounting part 42 is rotated (i.e., the direction in which the pedals are rotated) to make the bicycle travel. The one-way clutch 43 is also configured not to transmit the rotation of the rear wheel 107 in the traveling direction to the multiple gear cassette 54. The claw members 43a are spring-loaded in the rise-up direction with a spring member 43b. When the gear mounting part 42 is rotated in the direction that makes the bicycle move, the claw members 43a mesh with the ratchet teeth 43c formed on the radially inward facing surface of the gear mounting part 42 and the rotation is transmitted from the gear mounting part 42 to the base part 41.

The gear mounting part 42 is a cylindrical member and has the multiple gear cassette 54 mounted in a non-rotatable manner to its outside circumference. Cover members 19b and 19c preferably made of, for example, metal or resin, are mounted in a detachable manner to the internal circumferential surface of the right-hand end of the gear mounting part 42 in order to cover the gap between the gear mounting part 42 and the hub shaft 5.

The brake mounting part 11 is preferably a separate entity from the case main body 12 and is fixed to the case main body 12 by press fitting. A brake drum 55a of a roller brake 55 is configured to be centered and mounted on the brake mounting part 11. The brake mounting part 11 is a step-like cylindrical member having a large-diameter radially outward facing surface 11a and a small-diameter radially outward facing surface 11b. The brake mounting part 11 also serves as the ball bearing part 14a of the bearing 7. Since the brake mounting part 11 functions as part of the bearing 7, the small-diameter radially outward facing surface 11b is press fitted into the press fitting hole 12i of the case main body 12 such that it is fixed without any play or looseness. Serrations 11c that mesh with the mounting recessed section 12h are formed on the large-diameter radially outward facing surface 11a and serrations 11d that engage with the brake drum 55a in a non-rotational manner are formed on the left-hand end of the large-diameter radially outward facing surface 11a.

Figure 5:
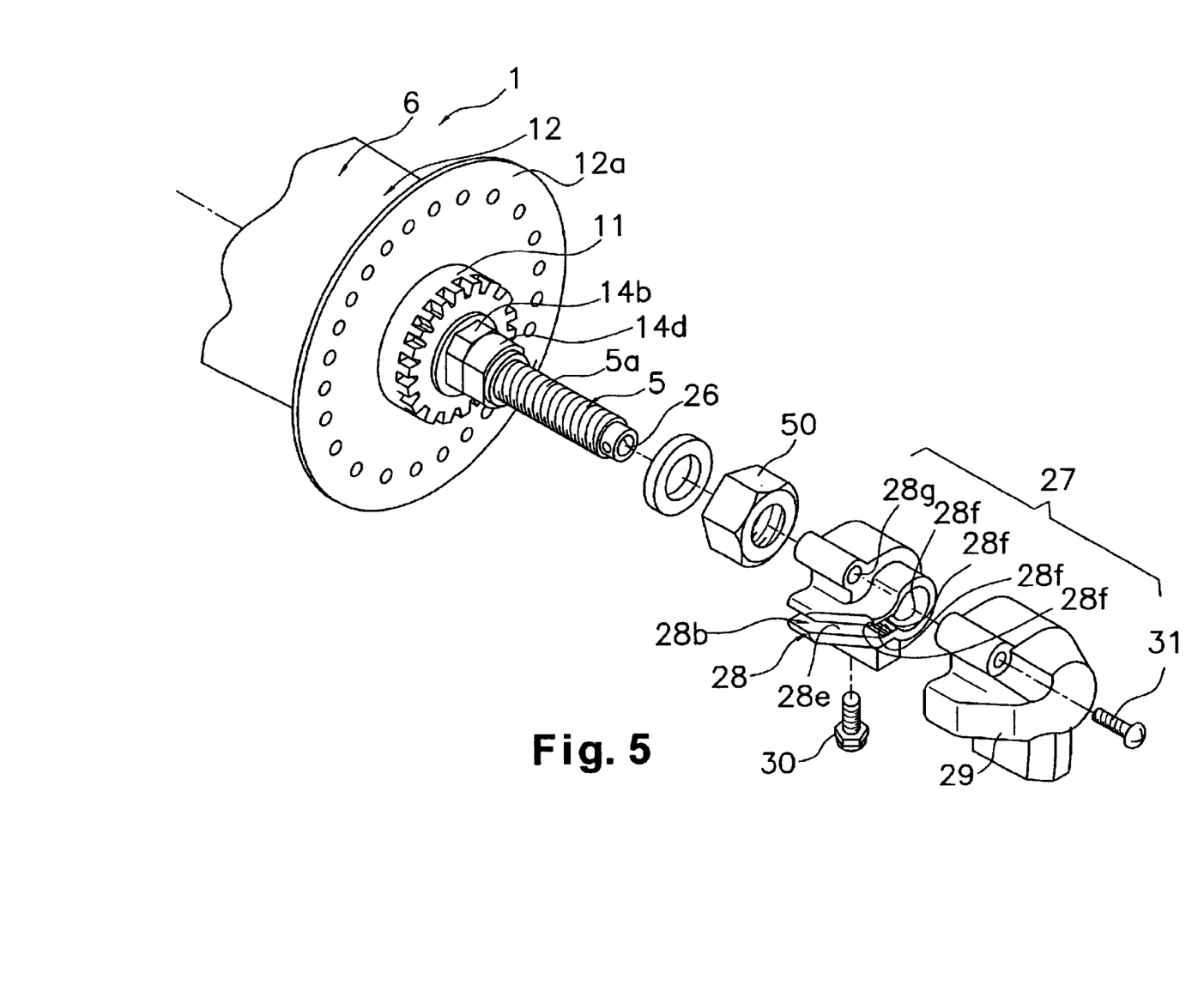
FIG. 5 is an exploded view of a wiring draw-out part and peripheral components of the bicycle hub generator in accordance with the first embodiment of the present invention.
Figure 6:
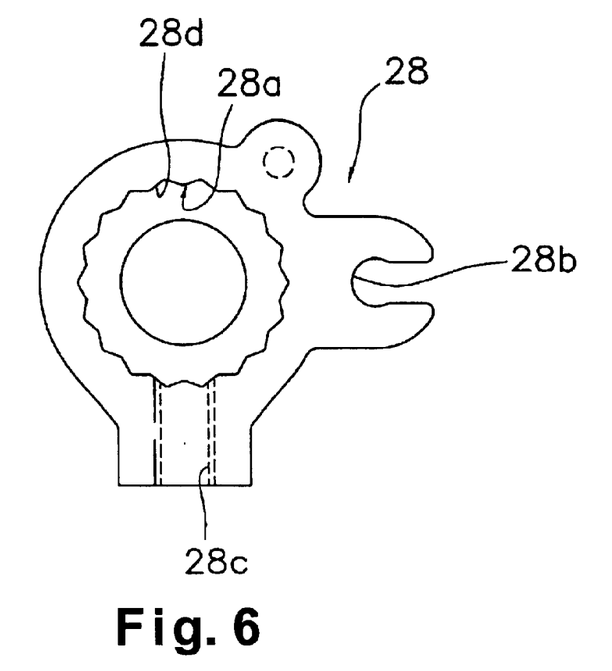
FIG. 6 is an enlarged right side elevational view of a guide member of the wiring draw-out part of the bicycle hub generator in accordance with the first embodiment of the present invention.

As shown in FIGS. 2, 3, and 5 to 8, the wiring draw-out part 27 includes a guide member 28 and a cover member 29. The guide member 28 is configured and arranged to engage in a non-rotatable manner with the nut 50 and to guide the wiring unit 25 extending from the left-hand end of the hub shaft 5. The cover member 29 is configured and arranged to cover the guide member 28 such that the wiring unit 25 that is guided by the guide member 28 is protected. As shown in FIGS. 5 and 6, the guide member 28 basically comprises an engaging section 28a, a guiding section 28b, and a fastening section 28c. The engaging section 28a is configured and arranged to engage in a non-rotatable manner with the nut 50. The guiding section 28b is configured and arranged to guide the wiring unit 25 drawn out from the left-hand end of the hub shaft 5. The fastening section 28c is configured and arranged such that the engaging section 28a can be fastened to the nut 50 with a second screw-threaded member or a fastening bolt 30. Thus, with the bicycle hub generator 1 of the present invention, the wiring draw-out part 27 can be fastened in a simple manner by merely turning the fastening bolt 30 such that the fastening bolt 30 moves toward a radially outward facing surface of the nut 50. As shown in FIG. 6, the engaging section 28a preferably has, for example, eighteen 120-degree angular sections 28d such that the engaging section 28a can be mounted to the radially outward facing surfaces of the nut 50 in eighteen different rotational orientations. As a result, the rotational position of the guiding section 28b can be set close to a prescribed or desired orientation irregardless of the rotational orientation of the nut 50. Thus, with the bicycle hub generator 1 of the present invention, the guide member 28 can be mounted to the radially outward facing surfaces of the first connecting member (the nut 50) at many different rotational orientations. Therefore, the direction in which wiring is drawn out is not greatly affected by variations in the rotational orientation achieved by the nut 50 when the hub shaft 5 is fastened to the swing arm 100 of the frame.

Figure 7:
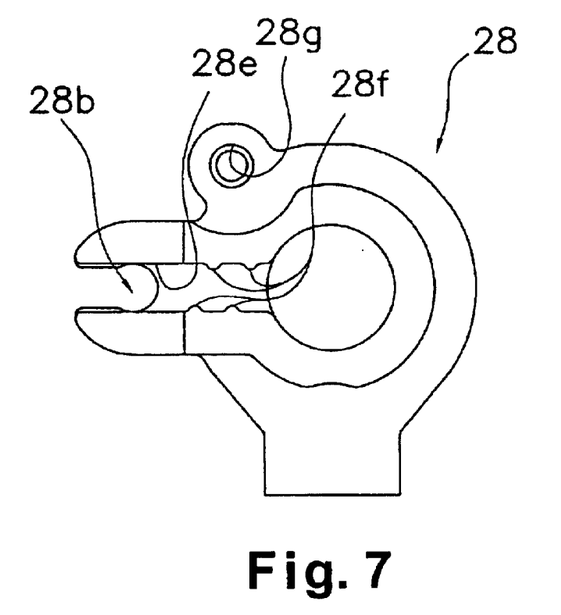
FIG. 7 is an enlarged left side elevational view of the guide member illustrated in FIG. 6 in accordance with the first embodiment of the present invention.

The guiding section 28b has a groove 28e and at least a portion of the groove 28e is preferably slightly narrower than a width of the wiring unit 25. The guiding section 28b also preferably has a plurality of wiring holding parts 28f that are formed in the groove 28e. The wiring holding parts 28f are configured and arranged to hold the wiring unit 25. Therefore, the guiding section 28b is configured and arranged to secure the wiring unit 25 in an elastic manner. Thus, the wiring unit 25 can be held by pressing the wiring unit 25 with the plurality of wiring holding parts 28f and utilizing the elastic quality of the wiring unit 25. Thus the wiring unit 25 can be held securely with a simple structure.

As shown in FIG. 2, the groove 28e is configured and arranged to bend the wiring unit 25 at approximately 90 degrees from the end of the hub shaft 5 and then bend the wiring unit 25 further such that the wiring unit 25 makes a U-turn from the shaft end. Therefore, the wiring unit 25 can be drawn out from the hub shaft 5 close to the swing arm 100. Moreover, the wiring unit 25 can be protected when the bicycle 101 falls over because the wiring unit 25 is guided in a direction perpendicular to the hub shaft 5.

The groove 28e is configured and arranged to have a sufficient axial depth to house the wiring unit 25 without the wiring unit 25 protruding to the outside. Thus, the wiring unit 25 can be housed inside a guide space formed by the groove 28e. The portion of the wiring unit 25 that is drawn to the outside from the guide member 28 is arranged so as to follow along the swing arm 100. Thus, with the bicycle hub generator 1 of the present embodiment, it is easy to make the wiring unit 25 coming out of the wiring draw-out part 27 and following along the swing arm 100 of the frame of the bicycle 101. As seen in FIG. 7, preferably four wiring holding parts 28f are arranged two-each on opposite walls of the groove 28e to be offset from each other at locations that are farther toward the radially outwardly than the portion where the wiring unit 25 bends approximately 90 degrees from the left-hand end of the hub shaft 5. With the wiring holding parts 28f positioned in this manner, the wiring unit 25 is pressed alternately in different directions by the wiring holding parts 28f as the wiring unit 25 passes through the groove 28e in an undulated manner. Consequently, movement of the wiring unit 25 is restricted along the portion where the wiring holding parts 28f are located. Therefore, if the wiring unit 25 gets yanked from the outside, it will be difficult for the wiring unit 25 to break at a position in the wiring passage 26 inside the hub shaft 5, i.e., at a position on the electricity generating mechanism 9 side of the wiring holding parts 28f. In other words, it is difficult for the wiring unit 25 to break inside the hub shaft 5 even if the wiring is pulled from the outside because the movement of the wiring is restrained by the wiring holding parts 28f. Moreover, it is more difficult for the wiring unit 25 to break because the wiring unit 25 is held at a position further outside of the portion where the wiring unit 25 bends in the perpendicular direction, at which portion the wiring unit 25 is generally easy to break. Also, as seen in FIGS. 5–7, a screw-threaded hole 28g for fastening the cover member 29 is provided in a portion of the guide member 28 that faces the cover member 29.

The fastening section 28c has a screw-threaded portion into which the fastening bolt 30 is inserted, and the guide member 28 is fastened to the nut 50 by pressing against a radially outward facing surface of the nut 50 with the fastening bolt 30. With this embodiment, the wiring is arranged on the back side of the swing arm 100. Thus, it is difficult to detect the wiring in the external appearance of the bicycle 101 and the external appearance of the bicycle 101 is improved.

Figure 8:
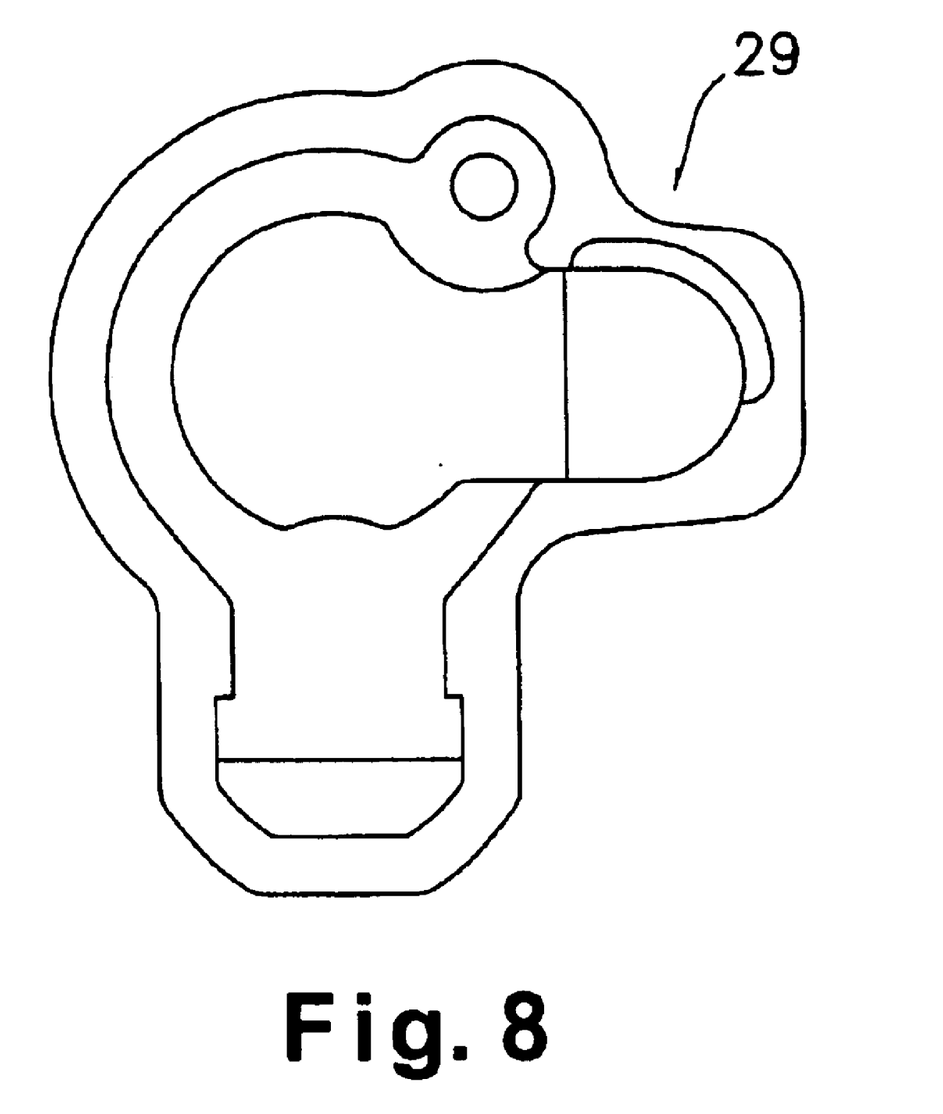
FIG. 8 is an enlarged right side elevational view of a cover member of the wiring draw-out part of the bicycle hub generator in accordance with the first embodiment of the present invention.

As shown in FIG. 5, the cover member 29 is fastened to the guide member 28 with a first screw-threaded member or a screw 31 that is screwed into the screw-threaded hole 28g. Thus, with the bicycle hub generator 1 of the present invention, the cover member 29 can be attached and detached easily by using the screw 31. Moreover, as shown in FIGS. 2, 5, and 8, the cover member 29 is preferably shaped such that the cover member covers an entire outside surface of the guide member 28 except the portion of the surface of the guide member 28 that faces the swing arm 100. As a result, the wiring unit 25 is protected, and also contaminants can be prevented from entering from the left end of the hub shaft 5. Moreover, with the bicycle hub generator 1 of the present invention, the first shaft end is covered by the wiring draw-out part 27 and the second shaft end is protected by the cap nut 51 as seen in FIG. 2. As a result, both ends of the hub shaft 5 are less likely to be damaged and the screw threads on the outside of the hub shaft 5 are also protected from damage.

The operation of the hub generator 1 will now be described. When the pedals of the bicycle 101 are turned, the rotation of the gear crank is transmitted to the multiple gear cassette 54 through the chain, and the gear mounting part 42 rotates. This rotation of the gear mounting part 42 is transmitted to the base part 41 through the one-way clutch 43 to rotate the hub body 6, causing the rear wheel 107 to rotate in the direction of travel of the bicycle 101. When the pedals of the bicycle 101 are stopped while the bicycle 101 is traveling, rotation of the rear wheel 107 is not transmitted to the gear mounting part 42 because the one-way clutch 43 turns off. Thus, the gear crank does not rotate. However, the hub shaft 5 and the hub body 6 experience relative rotation.

When rear wheel 107, i.e., the hub body 6, rotates relative to the hub shaft 5, the permanent magnet 16 rotates relative to the internal stator unit 17 fixed to the hub shaft 5. As a result, the permanent magnet 16 rotates around the outside of the coil 20 and yoke 21, causing electricity to be generated.

The generated electric power is directed out through the wiring draw-out part 27 and delivered to, for example, the control devices 108 and/or 109, as well as the derailleurs, suspensions, and other electric devices equipped with the bicycle 101, through wiring (not shown) that is connected to the solderless terminals 25a of the wiring unit 25. Since the hub generator 1 is provided on the rear wheel 107 in the present embodiment, the distance over which the electric power is delivered to electric components mounted on the rear part of the bicycle 101 other than a lamp of the bicycle 101 is short and the electric power can be delivered with good efficiency. Since the wiring unit 25 is drawn out from the left end of the hub shaft 5, the wiring unit 25 does not become intermingled with the wiring and cables connected to the rear derailleur. In other words, with the bicycle hub generator 1 of the present embodiment, the wiring unit 25 can be prevented from tangled or can be routed in a less complex manner because the wiring unit 25 is drawn out on the opposite side as the side where the multiple-gear cassette is located, i.e., the side where a rear derailleur or other externally mounted gear changing device is used. The portion of the wiring unit 25 that is drawn through the wiring passage 26 and out from the left end of the hub shaft 5 is protected because the wiring unit 25 is covered and guided to the outside by the wiring draw-out part 27. In other words, with the bicycle hub generator 1 of the present embodiment, the wiring unit 25 is reliably protected because the guide member 28 is covered by the cover member 29 and the wiring draw-out part 27 can be securely fastened to the connecting member, i.e., the nut 50. Moreover, since the wiring draw-out part 27 is mounted by engaging with the nut 50, there is no need for a special mounting structure, and thus, the structure of the wiring draw-out part 27 remains simple.

Second Embodiment

Figure 9:
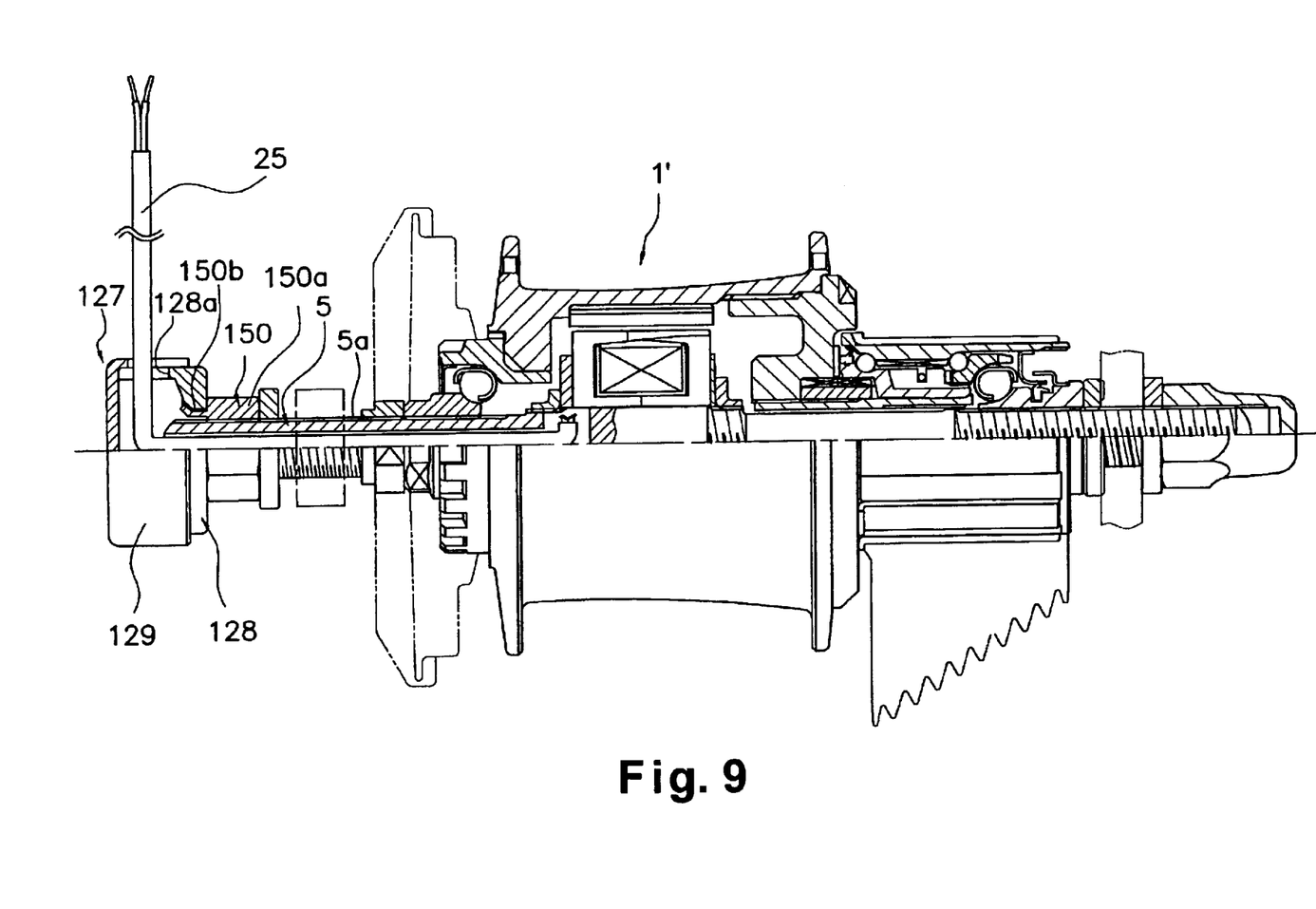
FIG. 9 is a partial cross sectional view of a bicycle hub generator in accordance with a second embodiment of the present invention.

Referring now to FIG. 9, a bicycle hub generator 1' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The bicycle hub generator 1' of the second embodiment is basically identical to the bicycle hub generator 1 of the first embodiment except the wiring draw-out part 127 and a nut 150 are substituted for the wiring draw-out part 27 and the nut 50 of the first embodiment. More specifically, the wiring draw-out part 127 of the second embodiment is configured and arranged to be rotatably mounted to the nut 150 as shown in FIG. 9, while the wiring draw-out part 27 of the first embodiment is mounted to the nut 50 in a non-rotatable manner. The nut 150 preferably has a nut main body 150a that screws onto the externally threaded section 5a of the hub shaft 5 and a rotatably engaging part 150b that is formed integrally with a top or left end surface (with respect to FIG. 9) of nut main body 150a. The wiring draw-out part 127 basically comprises a guide member 128 and a cover member 129. The guide member 128 is configured to rotatably mount to the nut 150 by elastically engaging with the rotatably engaging part 150a. The cover member 129 is configured to cover the guide member 128 such that the wiring unit 25 drawn out from the hub shaft 5 is protected. The guide member 128 includes a guide groove 128a formed in an outer circumferential portion of the guide member 128 for guiding the wiring unit 25 in a radial outward direction of the hub shaft 5. Thus, the wiring draw-out part 127 of the second embodiment is configured and arranged to guide the wiring unit 25 such that the wiring unit 25 is guided from the left-hand end of the hub shaft 5 in a radial direction with respect to the hub shaft 5. With this arrangement of the wiring draw-out part 127 and the nut 150, the wiring unit 25 can be drawn out in a prescribed direction, e.g., toward the portion where the guide groove 128a is formed, irrespective of the rotational orientation of the nut 150 when the hub shaft 5 is fastened to the swing arm 100. Thus, the wiring unit 25 can be made to follow along the swing arm 100 of the frame no matter what the shape of the frame is.

In the first and second embodiments explained above, the bicycle hub generator 1 or 1' is provided in the rear wheel 107 of the bicycle 101. However, it will be apparent to those skilled in the art from this disclosure that the bicycle hub generator 1 or 1' of the present invention can also be installed in the front wheel 106 of the bicycle 101.

Moreover, in the first and second embodiments, the wiring draw-out part 27 or 127 is provided on the left-hand end of the hub shaft 5 when the hub shaft 5 is viewed from the rear of the bicycle 101. However, it will be apparent to those skilled in the art from this disclosure that the wiring draw-out part 27 or 127 can also be provide on the right end of the hub shaft 5.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-306907. The entire disclosure of Japanese Patent Application No. 2003-306907 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub generator, comprising:
   a hub shaft having first and second shaft ends with first and second connecting members, respectively, adapted to be coupled to a frame of the bicycle;
   a hub body coupled to the hub shaft such that the hub body rotates freely with respect to the hub shaft;
   an electricity generating mechanism disposed between the hub body and the hub shaft, the electricity generating mechanism being configured and arranged to generate electricity using a relative rotation of the hub body with respect to the hub shaft;
   a wiring unit coupled to the electricity generating mechanism and configured and arranged to be coupled to an external bicycle device for supplying the electricity to the external bicycle device;

a wiring passage extending inside the hub shaft between the electricity generating mechanism and the first shaft end such that the wiring unit passes through the wiring passage from the electricity generating mechanism and extends out from the first shaft end; and a wiring draw-out part directly attached to the first connecting member at the first shaft end, the wiring draw-out part being configured and arranged to guide the wiring unit from the first shaft end to outside of the wiring draw-out part.

2. The bicycle hub generator as recited in claim 1, further comprising a freewheel provided on a first lateral side of the hub body arranged to mount a multiple-gear cassette in a non-rotatable manner and transmit rotation in a direction of travel of the bicycle to the hub body, and the first shaft end of the hub shaft being disposed on a second lateral side of the hub body that is opposite to the first lateral side of the hub body.

3. The bicycle hub generator as recited in claim 2, wherein the hub body includes a cylindrical case main body having an opening provided at the first lateral side such that the electricity generating mechanism can be installed through the opening, and a lid member removably coupled to the case main body to cover the opening, and the freewheel is mounted to the lid member of the hub body.

4. The bicycle hub generator as recited in claim 2, further comprising a brake device mounting part disposed on the second lateral side of the hub body, and configured and arranged to mount a brake device for braking the hub body.

5. The bicycle hub generator as recited in claim 1, wherein the wiring draw-out part is non-rotatably coupled to the first connecting member, the wiring draw-out part being further configured and arranged to guide the wiring unit such that the wiring unit extending from the first shaft end is folded substantially toward the frame of the bicycle at the first shaft end and guided to the outside of the wiring draw-out part so that the wiring unit follows along the frame.

6. The bicycle hub generator as recited in claim 5, wherein the wiring draw-out part includes a guide member configured and arranged to non-rotatably engage the first connecting member and guide the wiring unit, and a cover member configured and arranged to be detachably coupled to the guide member to cover the wiring unit guided by the guide member.

7. The bicycle hub generator as recited in claim 6, wherein the guide member has a guiding portion configured to guide the wiring unit from the first shaft end of the hub shaft in a direction substantially perpendicular to the hub shaft.

8. The bicycle hub generator as recited in claim 7, wherein the guiding portion comprises a groove for housing the wiring unit.

9. The bicycle hub generator as recited in claim 7, wherein the guiding portion of the guide member includes a wiring holding part configured to restrain movement of the wiring unit.

10. The bicycle hub generator as recited in claim 9, wherein the wiring draw-out part is configured and arranged to guide the wiring unit from the first shaft end such that the wiring unit bends in a direction substantially perpendicular to the hub shaft, and the wiring holding part is arranged radially outwardly with respect to a portion of the wiring draw-out part where the wiring unit bends in the direction substantially perpendicular to the hub shaft.

11. The bicycle hub generator as recited in claim 9, wherein the wiring holding part has at least one protrusion configured and arranged to hold the wiring unit.

12. The bicycle hub generator as recited in claim 1, wherein the wiring draw-out part is rotatably mounted to the first connecting member at the first shaft end of the hub shaft, the wiring draw-out part being further configured and arranged to guide the wiring unit such that the wiring unit is guided from the first shaft end in a radial direction of the hub shaft.

13. The bicycle hub generator as recited in claim 1, wherein the second connecting member is a cap nut configured to cover the second shaft end of the hub shaft.

14. A bicycle hub generator comprising:

a hub shaft having first and second shaft ends with first and second connecting members, respectively, adapted to be coupled to a frame of the bicycle;

a hub body coupled to the hub shaft such that the hub body rotates freely with respect to the hub shaft;

an electricity generating mechanism disposed between the hub body and the hub shaft, the electricity generating mechanism being configured and arranged to generate electricity using a relative rotation of the hub body with respect to the hub shaft;

a wiring unit coupled to the electricity generating mechanism and configured and arranged to be coupled to an external bicycle device for supplying the electricity to the external bicycle device;

a wiring passage extending inside the hub shaft between the electricity generating mechanism and the first shaft end such that the wiring unit passes through the wiring passage from the electricity generating mechanism and extends out from the first shaft end; and a wiring draw-out part coupled to the first connecting member at the first shaft end and including a guide member configured and arranged to non-rotatably engage the first connecting member and guide the wiring unit, and a cover member configured and arranged to be detachably coupled to the guide member to cover the wiring unit guided by the guide member, the wiring draw-out part being configured and arranged to guide the wiring unit from the first shaft end to outside of the wiring draw-out part, the wiring draw-out part being non-rotatably coupled to the first connecting member, the wiring draw-out part being further configured and arranged to guide the wiring unit such that the wiring unit extending from the first shaft end is folded substantially toward the frame of the bicycle at the first shaft end and guided to the outside of the wiring draw-out part so that the wiring unit follows alone the frame, the first connecting member being a hexagonal nut, and the guide member being configured and arranged to be mounted on radially outward facing surfaces of the hexagonal nut in at least six different rotational orientations.

15. A bicycle hub generator comprising:

a hub shaft having first and second shaft ends with first and second connecting members, respectively, adapted to be coupled to a frame of the bicycle;

a hub body coupled to the hub shaft such that the hub body rotates freely with respect to the hub shaft;

an electricity generating mechanism disposed between the hub body and the hub shaft, the electricity generating mechanism being configured and arranged to generate electricity using a relative rotation of the hub body with respect to the hub shaft;

a wiring unit coupled to the electricity generating mechanism and configured and arranged to be coupled to an external bicycle device for supplying the electricity to the external bicycle device;

a wiring passage extending inside the hub shaft between the electricity generating mechanism and the first shaft end such that the wiring unit passes through the wiring passage from the electricity generating mechanism and extends out from the first shaft end; and a wiring draw-out part coupled to the first connecting member at the first shaft end and including a guide member configured and arranged to non-rotatably engage the first connecting member and guide the wiring unit, and a cover member configured and arranged to be detachably coupled to the guide member to cover the wiring unit guided by the guide member, the wiring draw-out part being configured and arranged to guide the wiring unit from the first shaft end to outside of the wiring draw-out part, the wiring draw-out part being non-rotatably coupled to the first connecting member, the wiring draw-out part being further configured and arranged to guide the wiring unit such that the wiring unit extending from the first shaft end is folded substantially toward the frame of the bicycle at the first shaft end and guided to the outside of the wiring draw-out part so that the wiring unit follows along the frame, and the guide member being provided with a screw-threaded hole for mounting the cover member onto the guide member with a first screw member.

16. A bicycle hub generator comprising:

a hub shaft having first and second shaft ends with first and second connecting members, respectively, adapted to be coupled to a frame of the bicycle;

a hub body coupled to the hub shaft such that the hub body rotates freely with respect to the hub shaft;

an electricity generating mechanism disposed between the hub body and the hub shaft, the electricity generating mechanism being configured and arranged to generate electricity using a relative rotation of the hub body with respect to the hub shaft;

a wiring unit coupled to the electricity generating mechanism and configured and arranged to be coupled to an external bicycle device for supplying the electricity to the external bicycle device;

a wiring passage extending inside the hub shaft between the electricity generating mechanism and the first shaft end such that the wiring unit passes through the wiring passage from the electricity generating mechanism and extends out from the first shaft end; and a wiring draw-out part coupled to the first connecting member at the first shaft end, the wiring draw-out part being configured and arranged to guide the wiring unit from the first shaft end to outside of the wiring draw-out part, the wiring draw-out part being non-rotatably coupled to the first connecting member, the wiring draw-out part being further configured and arranged to guide the wiring unit such that the wiring unit extending from the first shaft end is folded substantially toward the frame of the bicycle at the first shaft end and guided to the outside of the wiring draw-out part so that the wiring unit follows along the frame, and the wiring draw-out part being fixedly coupled to the first connecting member with a second screw member, and configured and arranged to be screwed in radially with respect to the hub shaft toward a radially outward facing surface of the first connecting member.

* * * * *